United States Patent [19]
Zerrer

[11] Patent Number: 5,826,478
[45] Date of Patent: Oct. 27, 1998

[54] NOZZLE FOR SUPPLYING A LIQUID TO A ROTATING TOOL

[75] Inventor: Gerhard Zerrer, Korb, Germany

[73] Assignee: Andreas Stihl AG & Co., Waiblingen, Germany

[21] Appl. No.: 761,650

[22] Filed: Dec. 6, 1996

[30] Foreign Application Priority Data

Dec. 6, 1995 [DE] Germany .................. 195 45 416.2

[51] Int. Cl.[6] .............................. B26D 7/08; B24B 55/02; B24B 23/02; B05B 1/00

[52] U.S. Cl. ................. 83/169; 83/698.11; 83/698.31; 83/168; 239/600; 451/358; 451/450

[58] Field of Search ................. 83/169, 168, 698.11, 83/698.31, 699.51; 451/358, 450; 239/600, 698.51

[56] References Cited

U.S. PATENT DOCUMENTS

| | | | |
|---|---|---|---|
| 2,276,824 | 3/1942 | Carruthers | 451/450 |
| 2,307,019 | 1/1943 | Cebik | 451/450 |
| 3,009,655 | 11/1961 | Palmer | 239/600 |
| 3,256,647 | 6/1966 | Hutton | 83/168 |
| 4,084,750 | 4/1978 | Fett | 239/600 |
| 4,414,783 | 11/1983 | Vincent | 83/169 |
| 4,484,417 | 11/1984 | Klingerman | 83/169 |
| 4,929,130 | 5/1990 | Diebolt et al. | 451/450 |

FOREIGN PATENT DOCUMENTS

| | | | |
|---|---|---|---|
| 325825 | 9/1920 | Germany | 239/600 |
| 1534241 | 11/1978 | United Kingdom | 239/600 |

*Primary Examiner*—Maurina T. Rachuba
*Assistant Examiner*—Sean A. Pryor
*Attorney, Agent, or Firm*—Robert W. Becker & Associates

[57] ABSTRACT

A nozzle for supplying a liquid to a rotating tool of a cutter has a nozzle body and a hose connector connected to the nozzle body for supplying a liquid to the nozzle. The nozzle body has a fastening portion for mounting the nozzle body in a receiving openining of a protective cover wall. A radially expandable clamping member is positioned on the fastening portion for engaging the receiving opening.

5 Claims, 3 Drawing Sheets

NOZZLE FOR SUPPLYING A LIQUID TO A ROTATING TOOL

BACKGROUND OF THE INVENTION

The present invention relates to a nozzle for supplying a liquid to a rotating tool, especially to a cutting wheel of a cutter positioned within a protective cover. The nozzle comprises a hose connector for supplying the liquid and a fastening portion for mounting the nozzle in a receiving opening of the housing wall of the protective cover.

Such nozzles are used in cutters in order to supply water to the cutting wheel. The cutting wheel is rotatably driven by a drive motor of the cutter via a V-belt. The cutting wheel is supported by a support arm and partially enclosed by the protective cover. The protective cover serves to protect the operator against tangentially thrown cutting dust and flying sparks. The water supplied via the nozzle mixes with the cutting dust and binds it. The binding of the cutting dust prevents dust particles from floating in the air so that the environment is protected from dirt and dust. Especially when using diamond-coated cutting wheels with great output the water supply also provides cooling of the cutting wheel.

The nozzle is inserted into a receiving opening within the protective cover and is screwed to the protective cover. The nozzle in the working direction is positioned downstream of the axis of rotation of the cutting wheel so that the water hits the cutting wheel already before the cutting wheel cuts into the material. Upon impinging on the cutting wheel the water is entrained in the direction of rotation on the cutting wheel until centrifugal forces throw the water droplets toward the cutting dust. The mounting with screw connection of the nozzle within the protective cover, in which the nozzle is fastened with a nut at the inner side of the protective cover, is to be performed manually. When the cutting wheel is to be positioned on the other side of the support arm, for example, in order to cut material positioned within an area that is difficult to access, the protective cover and the cutter wheel must be mounted on the that side of the support arm. The receiving opening for the nozzle, when viewed in the working direction, is now positioned upstream of the axis of rotation of the cutting wheel. In order for the water supplied to the cutting wheel to still be guided toward the cutting dust, the nozzles must be removed and then inserted and mounted within other receiving openings which, for a turned protective cover, now are upstream of the axis of rotation of the cutting wheel. This requires an increased mounting and demounting expenditure.

It is therefore an object of the present invention to improve a nozzle for supplying liquid to a rotating tool protected within a protective cover such that mounting and demounting of the nozzle is facilitated.

SUMMARY OF THE INVENTION

The nozzle for supplying a liquid to a rotating tool of a cutter according to the present invention is primarily characterized by:

A nozzle body;

A hose connector connected to the nozzle body for supplying a liquid to the nozzle;

The nozzle body having a fastening portion for mounting the nozzle body in a receiving opening of a protective cover wall;

A radially expandable clamping member positioned on the fastening portion for engaging the receiving opening.

The clamping member preferably frictionally engages the inner wall of the receiving opening.

The clamping member is preferably a spreader ring slipped onto the nozzle body, wherein the spreader ring consists of an elastic material, preferably an elastic material that has a high elastic modulus.

In another embodiment of the present invention the nozzle further comprises an adjustable pressure-generating device for axially loading the spreader ring.

The pressure-generating device is preferably a screw threaded into the nozzle body.

Advantageously, the nozzle further comprises a sleeve arranged on the nozzle body between the screw and the spreader ring so as to be axially displaceable.

The nozzle may also comprise a nozzle housing axially clamped between the sleeve and the head of the screw.

In another preferred embodiment of the present invention, the nozzle further comprises a securing member for preventing rotation of the nozzle in the receiving opening. The nozzle body for this purpose has a radial bore, and the securing member is inserted into the radial bore and supported at the nozzle housing.

The nozzle body has a hollow interior with an inner thread and the screw is received in the inner thread.

The fastening portion preferably has a radially inwardly narrowing conical step facing the spreader ring. The spreader ring has a matching conical end portion. The conical end portion of the spreader ring and the conical step rest axially slidably on one another.

According to the present invention, the nozzle can be inserted without problems from the exterior into the receiving openings of the protective cover. Additional fastening means that are to be mounted from the inner side of the protective cover are obsolete. An accidental loosening of the nozzle can be reliably prevented because the radially widening clamping member provides a clamping force that secures the nozzle within the receiving opening. For demounting, the radial spreading of the clamping member is reduced and the nozzle can thus be removed manually without force expenditure from the receiving opening.

Expediently, the radially widening clamping member is secured by an axial frictional connection between the mantle surface of the nozzle and the inner wall of the receiving opening. The frictional connection depends on the amount of radial widening of the clamping member and can be adjusted from the exterior. The clamping member, that is advantageously in the form of a spreader ring made of elastic material with high elastic modulus and slipped onto the nozzle body, can be loaded axially by a pressure-generating device. The pressure acting axially onto the spreader ring causes, due to the elasticity of the spreader ring, a radial widening. Since a widening (expansion) is only possible within the diameter of the receiving opening, a counter force supported at the protective cover results that is directed radially inwardly and clamps the nozzle body securely within the receiving opening of the protective cover. For demounting the nozzle, the pressure generated by the pressure-generating device is reduced so that the spreader ring, due to its elasticity, regains its original shape and the radial forces are reduced. The reduction of radial forces also results in a reduction of the frictional forces of the axial frictional connection. The nozzle can be removed easily from the receiving opening at the protective cover.

The pressure-generating device is provided in the form of a screw which is expediently threaded into the nozzle body. In this embodiment all components that generate axial and radial forces are supported at the nozzle body and are thus independent of further means at the protective cover so that a position change of the nozzle from one receiving opening into another receiving opening is possible with only a few manipulations.

The screw is advantageously threaded into the inner thread of the hollow interior of the nozzle body of the nozzle. Between the screw and the spreader ring a sleeve may be arranged that is axially displaceable on the nozzle body, via which the pressure force is transmitted. In order to prevent an accidental rotation of the nozzle during tightening or loosening of the screw, a securing member that is radially insertable into the nozzle body is provided and is supported at a housing of the nozzle.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
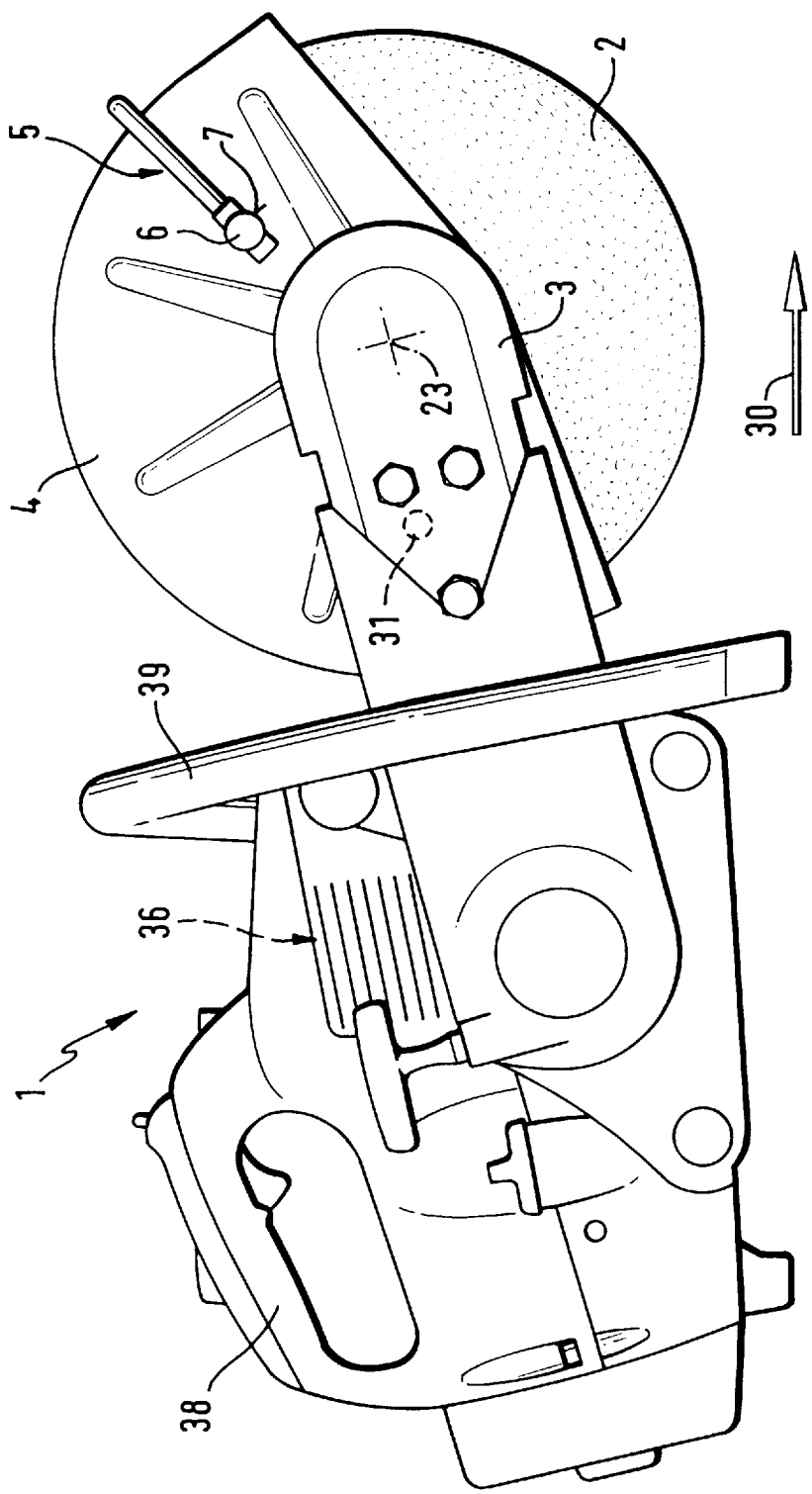
FIG. 1 is a cutter with a water nozzle mounted at the protective cover of the cutter.

The present invention will now be described in detail with the aid of a specific embodiment utilizing FIGS. 1 through 3.

Figure 2:
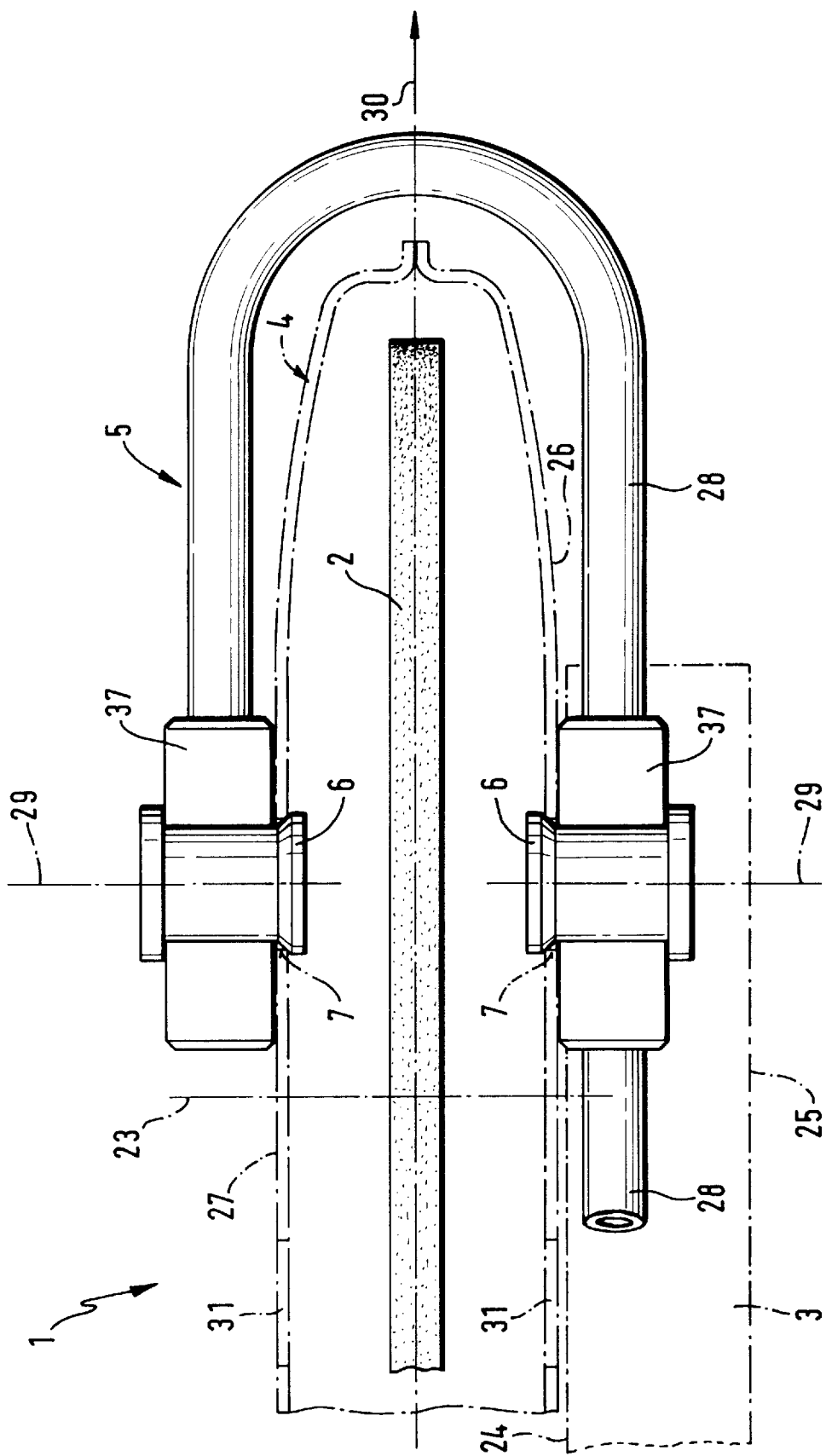
FIG. 2 is a top view of two water nozzles oppositely mounted at the protective cover.

The working tool represented in FIG. 2 is a cutter 1 that is to be held and guided with two grips 38, 39. The cutter 1 comprises a drive motor 36 arranged at the housing which drives a tool, i.e., a cutting wheel 2 with a belt drive. The cutting wheel 2 is supported on a support arm 3 in which the V-belt of the belt drive is positioned. The cutting wheel 2 is enclosed over a portion of its circumference by a protective cover 4 which is provided for protecting the operator against cutting dust and flying sparks. In order to bind the cutting dust, a liquid, preferably water, is introduced in small amounts into the protective cover 4 which forms the housing. For this purpose, the protective cover 4 is provided with a receiving opening 7 (FIG. 2) in which a liquid supplying device 5 in the form of a nozzle 6 is provided. The water introduced through the nozzle 6 to the cutting wheel 2 binds the cutting dust and reduces thus the pollution of the surroundings. The nozzle 6, when viewed in the working direction 30, is positioned radially inwardly upstream of the axis of rotation 23 of the cutting wheel 2 so that the water impinging on the cutting wheel is first entrained in the direction of rotation on the cutting wheel 2 and then, due to centrifugal forces, flows radially outwardly in the direction to the cutting location where it is ejected onto the cutting dust.

The nozzle 6 comprises a nozzle body 6a which is received in a receiving opening 7 of the housing wall of the protective cover 4. The distance of the receiving opening 7 from the axis of rotation 23 of the cutting wheel 2 is expediently approximately half the radius of the cutting wheel 2. The receiving opening 7 with nozzle 6 is positioned in the area of the upper half of the cutting wheel 2 above the axis of rotation 23.

The cutting wheel 2 and the protective cover 4 are positioned at one side 24 of the support arm 3. A lateral housing wall 26 of the protective cover 4 is secured to the side 24 of the support arm 3 facing the protective cover 4.

The protective cover 4 comprises in both lateral housing walls 26 and 27 one receiving opening 7 into which a respective nozzle 6 of the water supplying device 5 is inserted. Both nozzles 6, which are diametrically oppositely arranged, are supplied with water via a common water line 28 which is inserted into the hose connectors 37 of the nozzles 6. Via the water line 28 water is supplied from an attached water container or a stationary water supply to the nozzles 6. The water supply (not shown) can be controlled with a valve (not shown) which is preferably provided directly at the cutter 1. The water supplied via the nozzles 6 impinges at a right angle on the cutting wheel 2. The longitudinal axis 29 of each nozzle 6 is positioned substantially at a right angle to the lateral surface of the cutting wheel 2. The water, in addition to binding the cutting dust, can also provide a cooling effect for the cutting wheel.

The cutter 1 is embodied such that the cutting wheel 2 as well as the protective cover 4 can also be mounted to the other longitudinal side 25 of the support arm 3. Since the fastening means of the protective cover are provided only at one of the lateral housing walls, the protective cover 4 must be rotated so that the receiving openings 7, when viewed in the working direction 30, are then positioned downstream of the axis of rotation 23 of the cutting wheel 2. In order to achieve in this position of the protective cover 4 also an optimal binding of the cutting dust, additional receiving openings 31 are provided in the housing wall of the protective cover 4, as is shown in FIGS. 1 and 2. Upon positional changes of the cutting wheel 2 and of the protective cover 4 from the shown position into a position mounted to the oppositely arranged side 25 of the support arm 3, the nozzles 6 are to be mounted in the receiving openings 31. In this other mounted position of the protective cover 4, the receiving openings 31, in the direction of working 30, are positioned upstream of the axis of rotation 23 of the cutting wheel 2.

Figure 3:
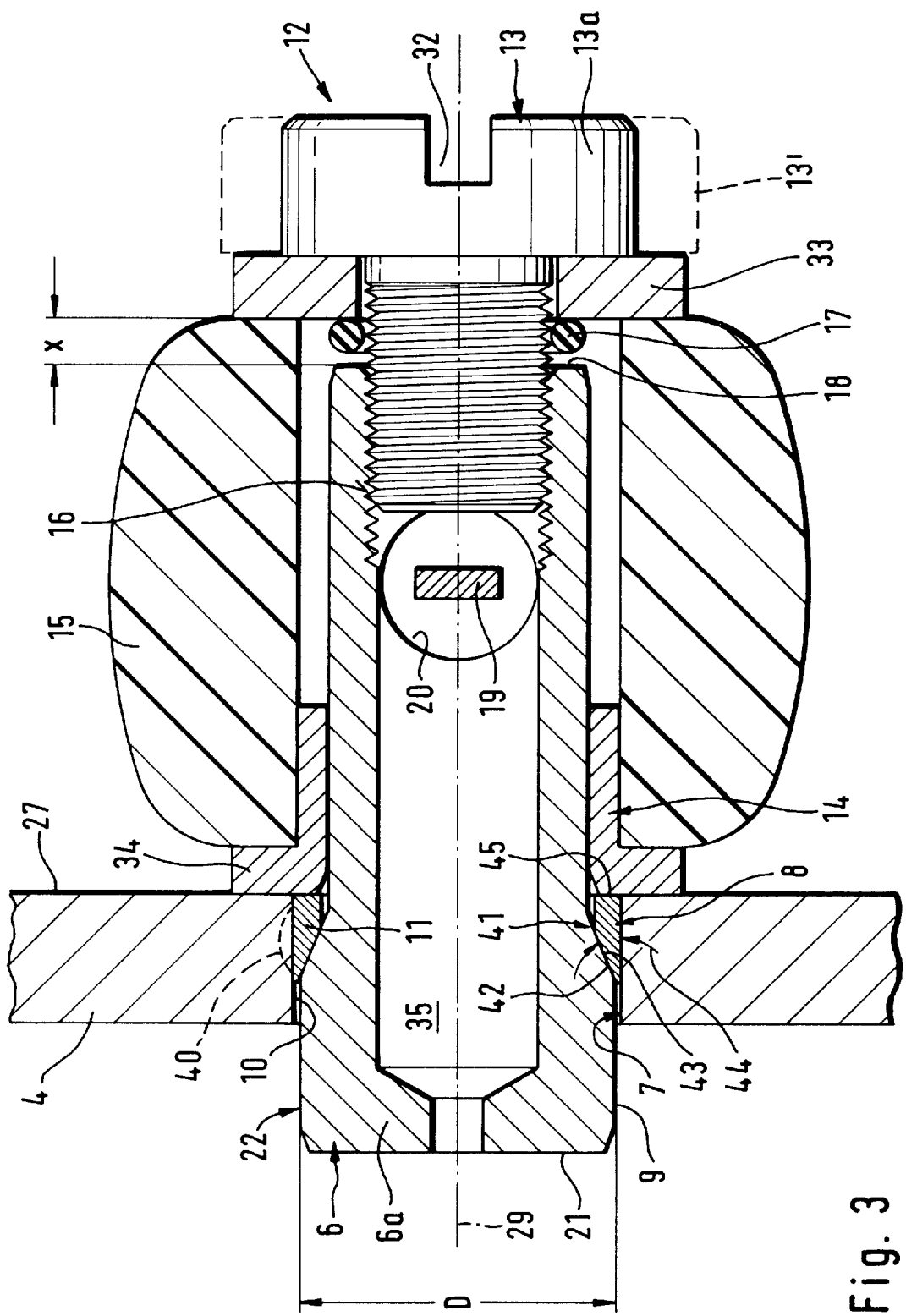
FIG. 3 shows in section a water nozzle mounted within the receiving opening of the protective cover in an enlarged representation.

In order to quickly change the nozzles 6 from one receiving opening 7 into the neighboring receiving opening 31 with simple means, the nozzle body 6a of each nozzle 6 is provided with a fastening portion 22 which comprises a radially expandable clamping member 8 (FIG. 3). The clamping member 8 is in the form of a slotted spreader ring 11 having an outer diameter in the unloaded state that is a little smaller than the inner diameter of the receiving opening 7, respectively, 31. It is arranged within the range of a step 41 of the outer diameter of the nozzle body 6a whereby even the greater outer diameter D is somewhat smaller than the inner diameter of the receiving opening 7. The end face 43 of the step 41 facing the spreader ring 11 is in the form of an inwardly slanted surface similar to a conical mantle surface and is positioned at a slant of an angle 44 of approximately 15° to 40°, preferably 25°, to the mantle surface 9 of the fastening portion 22 of the nozzle body 6a. The spreader ring 11 comprises at its end facing the step 41 a conically widening end portion 42. Its conical mantle surface corresponds to the slant angle 44 of the end face 43. The surfaces 42 and 43 thus rest in a slidable manner on one another. The clamping member 8 in the form of spreader ring 11 in the expanded state thus rests frictionally between the mantle surface 9 of the fastening portion 22 and the inner wall 10 of the receiving opening 7. A frictional connection is achieved between the nozzle body 6a and the clamping member 8 as well as between the clamping member 8 and the receiving opening 7 so that the nozzle 6 is fixedly and securely clamped within the receiving opening 7.

For mounting the nozzle 6 in one of the receiving openings 7, respectively, 31, the nozzle body 6a of the nozzle 6 is inserted, with the fastening portion 22 leading, into the receiving opening. The spreader ring 11 is slipped onto the nozzle body 6a of the nozzle 6 and, in the undeformed state, preferably rests with play within the receiving opening 7. After insertion, the spreader ring 11 is radially expanded so that a frictional connection is provided. For demounting the nozzle 6, the frictional connection is released by reducing the radial expansion of the spreader ring. After this has been achieved, the nozzle 6 can be easily removed from the receiving opening 7.

The spreader ring is either a steel ring or is comprised of another elastic material with advantageously high elastic modulus, for example, a highly elastic plastic material.

For producing the forces for expanding the spreader ring 11, a pressure-generating device 12 is provided that acts axially onto an end face 45 of the spreader ring 11 facing the conical step 41 and has an adjustable pressure force. The pressure-generating device 12 is provided in the form of a screw 13 that can be threaded into the inner thread 16 of the nozzle body 6a. The head 13a of the screw 13 comprises an engagement slot 32 for a screwing tool. Between the head 13a of the screw 13 and the axial end face 45 of the spreader ring 11 an axially displaceable sleeve 14 is arranged on the nozzle body 6a of the nozzle 6. It is provided with an inner chamfer at the side facing the spreader ring. The clamping force generated by the screw 13 by being threaded into the inner thread 16 is transmitted by the head 13a via the washer 33 onto the nozzle housing 15 that is engaged by the sleeve 14. For abutting the housing 15, the sleeve 14 is provided with a radial collar 34 which rests also at the spreader ring 11. The radial collar 34 has a greater diameter than the spreader ring 11 so that the sleeve 14 rests with an annular surface of the end face of the collar 34 that is facing the side surface 27 at the protective cover 4. The pressure-generating device 12 is thus supported at the protective cover 4. In this position, the spreader ring 11 is in contact with the step 41 which is substantially conically shaped. The spreader ring 11 has expediently a shape adapted to the annular space between the inner wall 10 of the receiving opening 7 of the protective cover 4 and the mantle surface 9 of the nozzle body 6a of the nozzle 6. The fastening portion 22 of the nozzle 6 extends from the step 41 to the axial end face 21 of the nozzle which extends into the interior of the protective cover 4 and faces the cutting wheel 2. The outer diameter of the fastening portion 22 has play relative to the inner diameter of the receiving opening 7 so that an insertion of the fastening portion 22 into the receiving opening 7 is possible with only minimal or without friction.

When the end face of the collar 34 of the sleeve 14 rests at the side surface 27 of the protective cover 4, the nozzle body 6a is displaced in a direction toward the screw 13 upon further tightening of the screw 13. The spreader ring 11 resting at the conical step 41 is thus entrained until it contacts the collar 34 of the sleeve 14. Upon further tightening of the screw 13, the base body 6a is displaced relative to the sleeve 14, fixedly connected within the housing, and the spreader ring 11 so that the slanted surfaces 42 and 43 which rest on one another cause a widening (expansion) of the spreader ring 11. Since the spreader ring 11 is positioned exactly within the radius of the bore of the receiving opening 7, it will contact the inner wall 10 of the receiving opening 7 whereby a counter force is generated by the protective cover 4 which is oriented radially inwardly. Thus, frictional connection results. The spreader ring is thus clamped within the receiving opening 7. For increasing the friction, the outer circumference of the spreader ring 11 can be made rough or can be provided with a friction layer.

For demounting the nozzle 6 from the receiving opening 7, the screw 13 is to be removed from the inner thread 16 so that the spreader ring 11 is axially relieved and, due to its elasticity, will assume its original shape in which the axial friction between the nozzle 6 and the receiving opening 7 is reduced.

In order to secure the nozzle body 6a against rotation during insertion and removal of the screw 13 into and from the inner thread 16, a securing member 19 is provided which can be inserted into a radial bore 20 of the nozzle 6 and supports the nozzle body 6a at the housing 15. The bore 20 through which the water is introduced into the nozzle can receive the securing element 19 in a frictional or positive-locking manner. The securing members 19 is in the form of a pin, split-pin etc.

A sealing ring 17 in the form of an O-ring can be positioned at the axial end face 18 of the nozzle body 6a facing the screw 13 on the threaded portion of the screw 13. The sealing ring 17, when the nozzle is mounted, is forced axially by the washer 33 against the end face 18 of the hollow nozzle body 6a and thus tightly seals the liquid-guiding interior 35 of the nozzle 6 relative to the screw 13. The sealing ring 17 also functions as a securing device for the washer 33.

The diameter of the screw head can be widened, as indicated with the reference numeral 13' in FIG. 3. The washer 33 and optionally the sealing ring 17 can thus be omitted. Expediently, the washer 33 can also be a unitary part of the screw 13.

Advantageously, the distance x between the end face 18 of the nozzle body 6a and of the washer 33, respectively, the screw head 13a at the beginning of threading is such that the spreader ring 11 can be widened adequately without being overextended when the washer 33 contacts the end face 18. The nozzle housing 15 is advantageously manufactured of an elastic plastic material that can be slightly deformed under the action of the clamping force generated by the screw 13.

The clamping of the nozzle 6 within the receiving opening 7 can also be achieved with positive-locking action. As is indicated in dashed lines in the upper half of FIG. 3, at the inner wall 10 of the receiving opening 7 a circumferential groove 40 may be provided into which the spreader ring 11 is radially forced by the action of the axial pressure force so that in the axial direction 29 a positive-locking action is provided. It is also possible to have the spreader ring 11 contact the inner side of the protective cover 4 exterior to the receiving opening 7 under the action of the axial pressure so that the nozzle 6 is secured in a positive-locking manner between the radially expanded spreader ring 11 and the inner side of the protective cover 4.

The present invention is, of course, in no way restricted to the specific disclosure of the specification and drawings, but also encompasses any modifications within the scope of the appended claims.

What is claimed is:

1. A nozzle for supplying a liquid to a rotating tool of a cutter, said nozzle comprising:
   a nozzle body;
   a hose connector connected to said nozzle body for supplying a liquid to said nozzle;
   said nozzle body having a fastening portion for mounting said nozzle in a receiving opening of a protective cover wall;

a radially expandable clamping member positioned on said fastening portion for engaging the receiving opening;

said clamping member is a spreader ring slipped onto said nozzle body and consisting of an elastic material;

a screw threaded into said nozzle body for axially loading said spreader ring;

a nozzle housing axially clamped between said sleeve and a head of said screw;

a securing member for preventing rotation of said nozzle in the receiving opening, wherein said nozzle body has a radial bore and wherein said securing member is inserted into said radial bore and supported at said nozzle housing.

2. A nozzle according to claim 1, wherein said nozzle body has a hollow interior with an inner thread and wherein said screw is received in said inner thread.

3. A nozzle according to claim 1, wherein said fastening portion has a radially inwardly narrowing conical step facing said spreader ring and wherein said spreader ring has a matching conical end portion, wherein said conical end portion of said spreader ring and said conical step rest axially slidably on one another.

4. A nozzle according to claim 1, wherein said elastic material has a high elastic modulus.

5. A nozzle according to claim 1, further comprising a sleeve arranged on said nozzle body between said screw and said spreader ring so as to be axially displaceable.

* * * * *